US012412913B2

(12) United States Patent  
Daly et al.

(10) Patent No.: US 12,412,913 B2  
(45) Date of Patent: Sep. 9, 2025

(54) SYSTEM INCLUDING FUEL CELL ASSEMBLY VOLTAGE MONITOR

(71) Applicant: FuelCell Energy, Inc., Danbury, CT (US)

(72) Inventors: Joseph Michael Daly, Bethel, CT (US); Stephen Jolly, Middlebury, CT (US); Ramakrishnan Venkataraman, Danbury, CT (US); Eric Nuhfer, Waterbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 504 days.

(21) Appl. No.: 18/072,287

(22) Filed: Nov. 30, 2022

(65) Prior Publication Data  
US 2023/0094726 A1 Mar. 30, 2023

Related U.S. Application Data

(60) Division of application No. 17/198,771, filed on Mar. 11, 2021, now Pat. No. 11,545,684, which is a  
(Continued)

(51) Int. Cl.  
H01M 8/0444 (2016.01)  
B01D 53/30 (2006.01)  
(Continued)

(52) U.S. Cl.  
CPC ........ H01M 8/04559 (2013.01); B01D 53/30 (2013.01); B01D 53/326 (2013.01);  
(Continued)

(58) Field of Classification Search  
CPC ......... H01M 8/04559; H01M 8/04097; H01M 8/04156; H01M 8/04365; H01M 8/04388;  
(Continued)

(56) References Cited

U.S. PATENT DOCUMENTS 4,810,595 A  3/1989  Kahara et al.  
5,134,043 A  7/1992  Nakazawa  
(Continued)

FOREIGN PATENT DOCUMENTS

WO  WO-2020/053793  3/2020

OTHER PUBLICATIONS

Discepoli et al. "Carbon capture with molten carbonate fuel cells: Experimental tests and fuel cell performance assessment" International Journal of Greenhouse Gas Control, vol. 9, Jul. 2012, pp. 372-384.

(Continued)

Primary Examiner — Christian Roldan  
(74) Attorney, Agent, or Firm — Foley & Lardner LLP

(57) ABSTRACT

A method for controlling a carbon dioxide utilization in a fuel cell assembly includes: measuring a voltage across the fuel cell assembly; determining an estimated carbon dioxide utilization of the fuel cell assembly based on at least the measured voltage across the fuel cell assembly by determining an expected voltage of the fuel cell assembly based on at least a temperature of the fuel cell assembly, a current density across the fuel cell assembly, a fuel utilization of the fuel cell assembly, and a cathode oxygen utilization of the fuel cell assembly; determining the estimated carbon dioxide utilization based on a comparison between the measured voltage and the determined expected voltage; comparing the determined estimated carbon dioxide utilization to a predetermined threshold utilization; and upon determining that the determined estimated carbon dioxide utilization is higher than the predetermined threshold utilization, reducing the carbon utilization of the fuel cell assembly.

11 Claims, 4 Drawing Sheets

Related U.S. Application Data continuation of application No. PCT/IB2019/057671, filed on Sep. 11, 2019.

(60) Provisional application No. 62/730,339, filed on Sep. 12, 2018.

(51) Int. Cl.
| | |
|---|---|
| *B01D 53/32* | (2006.01) |
| *B01D 53/62* | (2006.01) |
| *H01M 8/04089* | (2016.01) |
| *H01M 8/04119* | (2016.01) |
| *H01M 8/0432* | (2016.01) |
| *H01M 8/0438* | (2016.01) |
| *H01M 8/04537* | (2016.01) |
| *H01M 8/04746* | (2016.01) |
| *H01M 8/04858* | (2016.01) |
| *H01M 8/0668* | (2016.01) |
| *H01M 8/14* | (2006.01) |

(52) U.S. Cl.
CPC ........ *B01D 53/62* (2013.01); *H01M 8/04097* (2013.01); *H01M 8/04156* (2013.01); *H01M 8/04365* (2013.01); *H01M 8/04388* (2013.01); *H01M 8/04395* (2013.01); *H01M 8/0441* (2013.01); *H01M 8/04455* (2013.01); *H01M 8/04462* (2013.01); *H01M 8/0447* (2013.01); *H01M 8/04589* (2013.01); *H01M 8/04753* (2013.01); *H01M 8/04761* (2013.01); *H01M 8/0494* (2013.01); *H01M 8/0668* (2013.01); *B01D 2257/504* (2013.01); *H01M 2008/147* (2013.01)

(58) Field of Classification Search
CPC ........... H01M 8/04395; H01M 8/0441; H01M 8/04455; H01M 8/04462; H01M 8/0447; H01M 8/04589; H01M 8/04753; H01M 8/04761; H01M 8/0494; H01M 8/0668; H01M 2008/147; H01M 8/04402; H01M 8/04649; B01D 53/30; B01D 53/326; B01D 53/62; B01D 2257/504; Y02A 50/20; Y02C 20/40; Y02E 60/50; Y02T 90/40
USPC ........................................................ 429/415
See application file for complete search history.

(56) References Cited

U.S. PATENT DOCUMENTS

| | | |
|---|---|---|
| 2005/0271914 A1 | 12/2005 | Farooque et al. |
| 2006/0068243 A1 | 3/2006 | Lienkamp |
| 2008/0160370 A1 | 7/2008 | Masse et al. |
| 2011/0168572 A1 | 7/2011 | Huang |
| 2013/0014484 A1 | 1/2013 | Caprile et al. |
| 2013/0034791 A1* | 2/2013 | Astrom ............ H01M 8/04776 429/443 |
| 2014/0272617 A1 | 9/2014 | Berlowitz et al. |
| 2015/0093665 A1* | 4/2015 | Barckholtz ............... C01B 3/38 429/423 |
| 2016/0359182 A1 | 12/2016 | Farooque et al. |
| 2017/0271701 A1 | 9/2017 | Berlowitz et al. |

OTHER PUBLICATIONS

International Search Report and Written Opinion in PCT/IB2019/057671 dated Apr. 24, 2020 (6 pages).

* cited by examiner

SYSTEM INCLUDING FUEL CELL ASSEMBLY VOLTAGE MONITOR

CROSS-REFERENCE TO RELATED PATENT APPLICATIONS

This application is a divisional of U.S. patent application Ser. No. 17/198,771, filed Mar. 11, 2021, which is a bypass continuation of PCT Patent Application No. PCT/IB2019/057671, filed Sep. 11, 2019, which claims priority from Provisional Patent Application No. 62/730,339, filed Sep. 12, 2018. The entire disclosures of these applications are incorporated herein by reference.

BACKGROUND

The present disclosure relates generally to the field of fuel cell power production systems. In particular, the present disclosure relates to systems and methods useable in a fuel cell power production system for controlling carbon dioxide capture and utilization.

A fuel cell, such as a molten carbonate fuel cell (MCFC), is a device which directly converts chemical energy stored in hydrocarbon fuel into electrical energy via an electrochemical reaction. Generally, a fuel cell includes an anode and a cathode separated by an electrolyte layer or matrix which conducts electrically charged ions. To increase power production or output, multiple fuel cells are arranged in series (also known as a fuel cell stack), with an electrically conductive separator between each individual cell.

As a molten carbonate fuel cell generates an electrical current, carbon dioxide is transferred from the cathode (or oxidant) side to the anode (or fuel side) of the fuel cell. At the cathode side, the carbon dioxide is dilute and accordingly more difficult to separate from other gaseous substances (such as nitrogen or oxygen). At the anode side, the carbon dioxide is more concentrated and accordingly more easily separated from the primary co-component of water and hydrogen.

When the MCFC is operated in a carbon capture mode, flue gas containing carbon dioxide from an external source (such as exhaust from a carbonaceous-fuel-fired power plant) is fed to the cathode side of the fuel cell. The fuel cell is operated to maintain a predetermined carbon capture rate, but there may be variability in the carbon content of the flue gas as it is introduced to the cathode side of the fuel cell. If carbon dioxide over-utilization occurs (such as removal of excessive amounts of carbon dioxide from the system), the fuel cell(s)' durability and/or life could be affected.

Accordingly, there is a need for systems and methods useable in a fuel cell system for preventing carbon dioxide over-utilization by controlling a carbon capture rate from the flue gas provided to a cathode of a fuel cell and ensure that a high percentage of the total available carbon in the flue gas is captured while achieving efficient operation of the fuel cell system.

SUMMARY OF THE INVENTION

According to one exemplary embodiment of the present disclosure, a system for capturing carbon dioxide in flue gas generated by a flue gas generating device includes a fuel cell assembly including at least one fuel cell including a cathode portion configured to receive, as cathode inlet gas, the flue gas generated by the flue gas generating device or a derivative thereof, and to output cathode exhaust gas, and an anode portion configured to receive an anode inlet gas and to output anode exhaust gas; a fuel cell assembly voltage monitor configured to measure a voltage across the fuel cell assembly; and a controller configured to receive the measured voltage across the fuel cell assembly from the fuel cell assembly voltage monitor, determine an estimated carbon dioxide utilization of the fuel cell assembly based on at least the measured voltage across the fuel cell assembly, and when the determined estimated carbon dioxide utilization is above a predetermined threshold utilization, reduce the carbon dioxide utilization of the fuel cell assembly.

According to one aspect of the system, the controller is configured to determine the estimated carbon dioxide utilization by performing steps including determining an expected voltage across the fuel cell assembly based on at least (i) a temperature of the fuel cell assembly, (ii) a current density across the fuel cell assembly, (iii) a fuel utilization of the fuel cell assembly, and (iv) a cathode oxygen utilization of the fuel cell assembly, and determining the estimated carbon dioxide utilization based on a comparison between the measured voltage across the fuel cell assembly and the determined expected voltage across the fuel cell assembly.

According to one aspect, the system also includes at least one temperature sensor configured to measure temperatures within the fuel cell assembly. The controller is configured to determine an average temperature of the fuel cell assembly based on the temperatures measured by the at least one temperature sensor.

According to one aspect, the system also includes a load controller configured to measure the current across the fuel cell assembly. The controller is configured to determine the current density across the fuel cell based on at least the current across the fuel cell assembly as measured by the load controller. The load controller may then increase or decrease the measured load to affect the current density such that the fuel cell operates at a desired current density for any particular operation.

According to one aspect, the system also includes a flow transmitter configured to measure a flow rate of the anode inlet gas. In particular, the flow transmitter may measure a flow rate of a fuel gas flow, where the anode inlet gas comprises a fuel gas flow. The controller is configured to determine the fuel utilization of the fuel cell assembly based on at least the flow rate of the fuel gas flow as measured by the flow transmitter.

According to one aspect, the system also includes at least one valve configured to adjust an amount of anode inlet gas provided to the anode portion of the fuel cell assembly. The controller is configured to control the at least one valve and to determine the fuel utilization of the fuel cell assembly based on at least the flow rate of the anode inlet gas as measured by the flow transmitter.

According to one aspect, the system also includes a hydrogen gas analyzer configured to measure a hydrogen content of the anode exhaust gas. The controller is configured to determine the fuel utilization of the fuel cell assembly based on at least the hydrogen concentration in the anode exhaust gas as measured by the hydrogen gas analyzer.

According to one aspect, the system also includes a cathode inlet gas flow transmitter configured to measure a flow rate of the cathode inlet gas; and a cathode inlet gas analyzer configured to measure a composition of the cathode inlet gas. The controller is configured to determine the cathode oxygen utilization based on at least the flow rate of the cathode inlet gas as measured by the cathode inlet gas flow transmitter, and the composition of the cathode inlet gas as measured by the cathode inlet gas analyzer.

According to one aspect, the system also includes a cathode outlet gas flow transmitter configured to measure a flow rate of the cathode outlet gas; and a cathode outlet gas analyzer configured to measure a composition of the cathode outlet gas. The controller is configured to determine the cathode oxygen utilization based on at least the flow rate of the cathode outlet gas as measured by the cathode outlet gas flow transmitter, and the composition of the cathode outlet gas as measured by the cathode outlet gas analyzer.

According to one aspect, the system also includes a cathode inlet gas flow transmitter configured to measure a flow rate of the cathode inlet gas; a cathode inlet gas analyzer configured to measure a composition of the cathode inlet gas, a cathode outlet gas flow transmitter configured to measure a flow rate of the cathode outlet gas; and a cathode outlet gas analyzer configured to measure a composition of the cathode outlet gas. The controller is configured to determine the cathode oxygen utilization based on at least the flow rate of the cathode inlet gas as measured by the cathode inlet gas flow transmitter, the measured composition of the cathode inlet gas as measured by the cathode inlet gas analyzer, the measured flow rate of the cathode outlet gas as measured by the cathode outlet gas flow transmitter, and the composition of the cathode outlet gas as measured by the cathode outlet gas analyzer.

According to one aspect, the system also includes a flue gas blower configured to receive flue gas from the flue gas generating device and output the flue gas to the anode gas oxidizer of the fuel cell assembly. The controller is configured to, when the determined estimated carbon dioxide utilization is above a predetermined threshold utilization, reduce the carbon dioxide utilization of the fuel cell assembly by at least controlling the flue gas blower to increase the flow rate of the flue gas, or the derivative thereof, provided to the cathode portion of the fuel cell assembly.

According to one aspect, the system also includes a load controller configured to control a current across the fuel cell assembly. The controller is configured to, when the determined estimated carbon dioxide utilization is above a predetermined threshold utilization, reduce the carbon dioxide utilization of the fuel cell assembly by at least controlling the load controller to reduce the current across the fuel cell assembly.

According to one aspect, the system also includes an anode exhaust processor configured to receive the anode exhaust gas, provide an anode exhaust gas return portion of the anode exhaust gas to an anode exhaust gas return line that is configured to provide the anode exhaust gas return portion to the cathode portion of the fuel cell assembly that is equipped with an anode gas oxidizer in a manner that is controllable by the controller (e.g., by modulation of a control valve), provide an anode exhaust gas recycle portion of the anode exhaust gas to an anode exhaust gas recycle line that is configured to provide the anode exhaust gas recycle portion to the anode section of the fuel cell assembly in a manner that is controllable by the controller (e.g., by modulation of a control valve), provide carbon dioxide separated from the anode exhaust gas to a carbon dioxide product line in a manner that is controllable by the controller, and provide water separated from the anode exhaust gas to a water product line in a manner that is controllable by the controller.

According to one aspect of the system, the controller is configured to, when the determined estimated carbon dioxide utilization is above a predetermined threshold utilization, reduce the carbon dioxide utilization of the fuel cell assembly by at least controlling the anode exhaust processor to reduce an amount of carbon dioxide product provided to the carbon dioxide product line, and increase an amount of the anode exhaust gas return portion provided to the cathode portion of the fuel cell assembly via the anode exhaust gas return line.

According to one aspect of the system, the anode inlet gas is a combination of fuel gas provided via a fuel gas inlet line, and water provided via a water inlet line, and the at least one valve includes a first valve configured to adjust an amount of fuel gas provided via the fuel gas inlet line, and a second valve configured to adjust an amount of water provided via the water inlet line.

According to one aspect, the system also includes an anode gas oxidizer configured to receive either one or both of the flue gas generated by the flue gas generating device and ambient air, and may also receive the anode exhaust gas return portion, oxidize any unreacted fuel which may be present in the anode exhaust gas return portion using the flue gas generated by the flue gas generating device and ambient air, and output the oxidized mixed gas to the cathode portion of the fuel cell assembly as the cathode inlet gas.

According to another exemplary embodiment of the present disclosure, a method for controlling a carbon dioxide utilization in a fuel cell assembly includes the steps of measuring a voltage across the fuel cell assembly using a fuel cell assembly voltage monitor, determining an estimated carbon dioxide utilization of the fuel cell assembly based on at least the measured voltage across the fuel cell assembly and an expected voltage of the fuel cell assembly, the expected voltage being determined based on at least a temperature of the fuel cell assembly, a current density across the fuel cell assembly, a fuel utilization of the fuel cell assembly, and a cathode oxygen utilization of the fuel cell assembly, and determining the estimated carbon dioxide utilization based on a comparison between the measured voltage across the fuel cell assembly and the determined expected voltage across the fuel cell assembly, comparing the determined estimated carbon dioxide utilization of the fuel cell assembly to a predetermined threshold utilization, and if the determined estimated carbon dioxide utilization of the fuel cell assembly is higher than the predetermined threshold utilization, reducing the carbon dioxide utilization of the fuel cell assembly.

According to one aspect, the method also includes measuring a flow rate of a fuel gas flow, where the anode inlet gas comprises at least the fuel gas flow and the water flow; and determining the fuel utilization of the fuel cell assembly based on at least the measured flow rate of the fuel gas flow.

According to one aspect, the method also includes measuring a hydrogen content of an anode exhaust gas; and determining the fuel utilization of the fuel cell assembly based on at least the measured hydrogen concentration in the anode exhaust gas.

According to one aspect, the method also includes measuring a flow rate of a cathode inlet gas; measuring a composition of the cathode inlet gas; and determining the cathode oxygen utilization of the fuel cell assembly based on at least the measured flow rate of the cathode inlet gas and the composition of the cathode inlet gas.

According to one aspect, the method also includes measuring a flow rate of a cathode outlet gas; measuring a composition of the cathode outlet gas; and determining the cathode oxygen utilization of the fuel cell assembly based on at least the measured flow rate of the cathode outlet gas and the composition of the cathode outlet gas.

DETAILED DESCRIPTION

Certain embodiments described herein are useable in maximizing the carbon capture rate within a fuel cell while not posing undue risks to the fuel cell caused by carbon dioxide over-utilization. Certain embodiments may also yield the beneficial result of increasing an efficiency of the delivery of a secondary product, the electricity exported from the fuel cell. Certain embodiments described herein implement a cost-effective way of determining carbon dioxide usage. Rather than measuring carbon dioxide usage (which can be expensive), certain embodiments described herein compute carbon dioxide usage based on a comparison of the measured and expected voltage. Another beneficial result of certain embodiments may be an increase in efficiency of exported hydrogen gas from the fuel cell system as a tertiary product. By determining the carbon content of a flue gas provided to the fuel cell system, the cathode flow rate and/or fuel cell current can be modulated to yield a desired product mix of carbon sequestration, power output, and hydrogen export.

Figure 1:
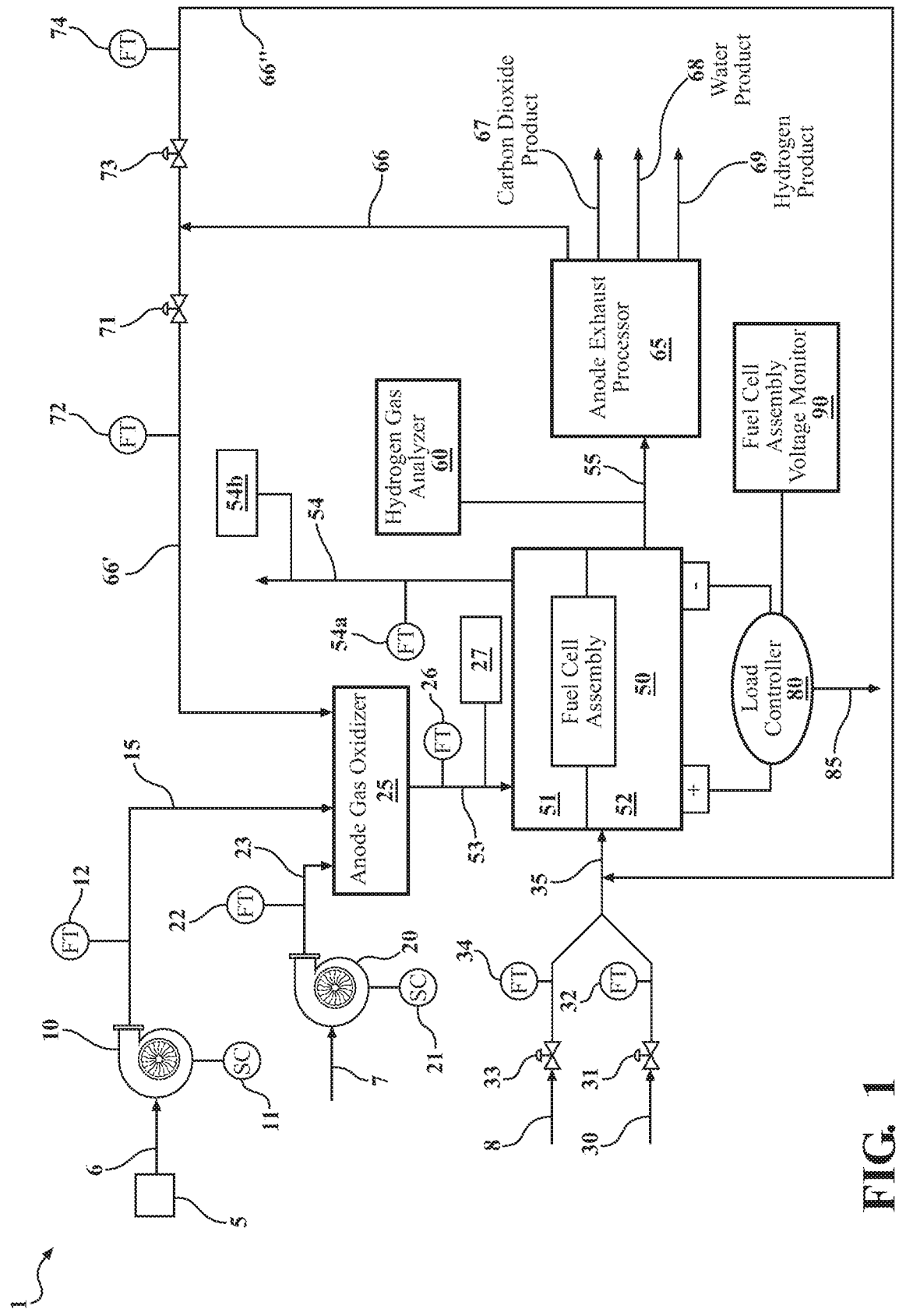
FIG. 1 is a system diagram showing a fuel cell system adapted for capturing carbon dioxide in flue gas, according to an exemplary embodiment.

FIG. 1 shows a fuel cell system 1 according to an exemplary embodiment of the present disclosure. The fuel cell system 1 includes a fuel cell assembly 50 having a cathode portion (e.g., cathode section) 51 and an anode portion (e.g., anode section) 52.

The cathode portion 51 of the fuel cell assembly 50 is configured to receive a cathode inlet gas flow 53. The cathode inlet gas flow 53 includes a flue gas flow 6 from a flue gas generating device 5 and/or a derivative gas flow 15 which is derived from the flue gas flow 6. The cathode inlet gas flow 53 is provided to the cathode portion of the fuel cell assembly 50 by an anode gas oxidizer 25 (described below). The cathode 51 is also configured to output a cathode exhaust gas flow (e.g., cathode outlet gas) 54.

The anode portion 52 of the fuel cell assembly 50 is configured to receive an anode inlet gas flow 35. The anode portion 52 of the fuel cell assembly 50 is also configured to output an anode exhaust gas flow (e.g., anode outlet gas) 55. According to one aspect, the anode inlet gas includes a water flow 8 provided to the anode portion 52 via a water inlet line and a fuel gas flow 30 provided to the anode portion 52 via a fuel gas inlet line. The flow of the water flow 8 is controllable by a valve 33 and a flow rate of the water flow 8 is measured by the flow transmitter 34. The flow of the fuel gas flow 30 is controllable by a valve 31, and a flow rate of the fuel gas flow 30 is measured by a flow transmitter 32. The flow transmitter 74 is configured to measure the flow rate of anode exhaust gas recycle flow as controlled by valve 73. The total anode inlet gas flow 35 is the sum of the flows 32, 34 and 74. The valves 31, 33 are configured to control an amount of the fuel gas flow 30 and an amount of the water flow 8, respectively, delivered to the anode portion 52 of the fuel cell assembly 50. The valves 31, 33 are controllable by the controller 100, shown in FIG. 2, such that when a determined estimated carbon dioxide utilization is above a predetermined threshold utilization, the controller 100 reduces the current flow in the fuel cell assembly 50 and to reduce the carbon dioxide utilization of the fuel cell assembly 50 and in turn adjusts the valves 31, 33 to decrease an amount of the anode inlet gas flow 35 provided to the anode portion 52 of the fuel cell assembly to match the anode inlet flow needed for the reduced current density. The anode portion 52 of the fuel cell assembly 50 is also configured to output an anode exhaust gas flow 55 to an anode exhaust processor 65 (described in more detail below).

In the fuel cell assembly 50, the carbon dioxide from the cathode portion 51 is electrochemically pumped to the anode portion 52. Thus the carbon dioxide moves from an environment (cathode portion 51) in which the concentration of carbon dioxide is low and diluted with species of oxygen and nitrogen from which the carbon dioxide is difficult to remove to an environment (anode portion 52) in which the concentration of carbon dioxide is relatively high and in the presence of species of hydrogen and water from which the carbon dioxide is more easily removed. Accordingly, the carbon dioxide, because it is more highly concentrated and physically dissimilar from primary co-components in the anode portion 52 of the fuel cell assembly 50, can more easily be separated from the primary co-components of water and hydrogen.

Figure 3:
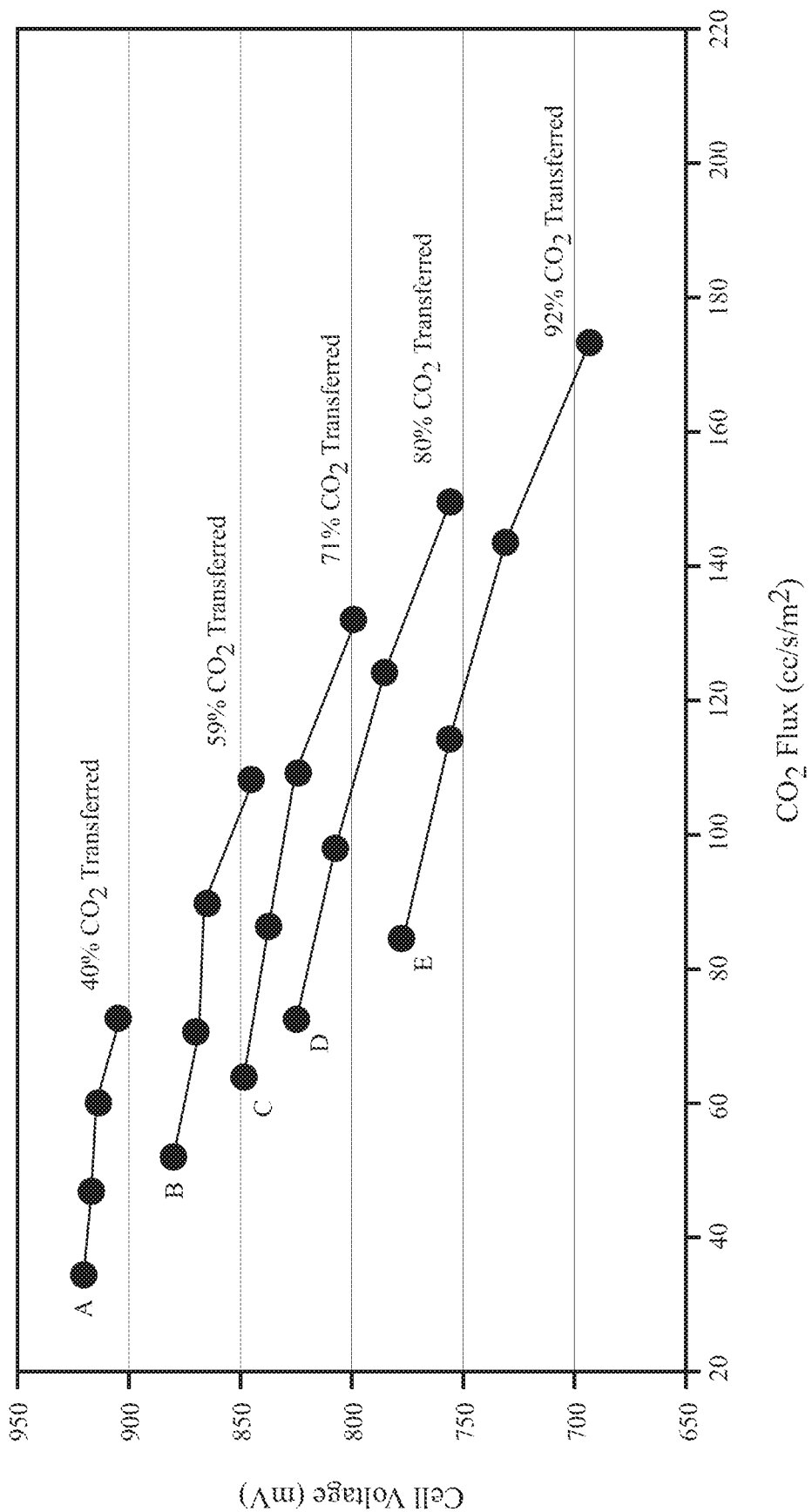
FIG. 3 is a graph illustrating a relationship between carbon dioxide flux of a fuel cell assembly and voltage across the fuel cell assembly, controlling for a percent of carbon dioxide captured.

The fuel cell system 1 also includes a fuel cell assembly voltage monitor 90 electronically coupled to the fuel cell assembly 50. The fuel cell assembly voltage monitor 90 is configured to measure a voltage across the fuel cell assembly 50. The fuel cell assembly voltage monitor 90 is configured to send a signal to a controller 100 (described below) based on the measured voltage across the fuel cell assembly 50. The voltage of a fuel cell is a function of current density (output), fuel utilization (fuel flow rate), cathode oxygen utilization, fuel cell temperature, and cathode carbon dioxide utilization. The fuel cell voltage can also change as a function of the amount of time the fuel cell operates. By correlating the fuel cell voltage to the known parameters and using the correlation to adjust at least one of the cathode gas flow rate, the fuel cell current (e.g., load), the amount of carbon dioxide which is allowed to cycle back to the cathode portion 51 of the fuel cell assembly 50 from the anode exhaust, the fuel cell assembly 50 can be prevented from over-utilizing carbon dioxide and maximize a carbon capture rate. FIG. 3 shows an exemplary relationship between carbon dioxide utilization of a fuel cell assembly and voltage across the fuel cell assembly. As shown in FIG. 3, the fuel cell voltage varies according to the carbon dioxide utilization (e.g., the voltage varies inversely to the carbon dioxide utilization). The lines shown in FIG. 3 are lines of constant percent of carbon dioxide transferred, or utilized; specifically, FIG. 3 shows lines corresponding to 40%, 59%, 71%, 80%, and 92% of carbon dioxide transferred. The fuel cell voltage is a function of carbon dioxide utilization of the fuel cell, with the result that the fuel cell voltage of the fuel cell assembly is useable as an accurate measure of carbon dioxide utilization in the fuel cell. This relationship was determined through a series of controlled tests in a fuel cell. If the fuel cell design is modified, a new relationship may have to determined based on additional tests with the new design.

Figure 2:
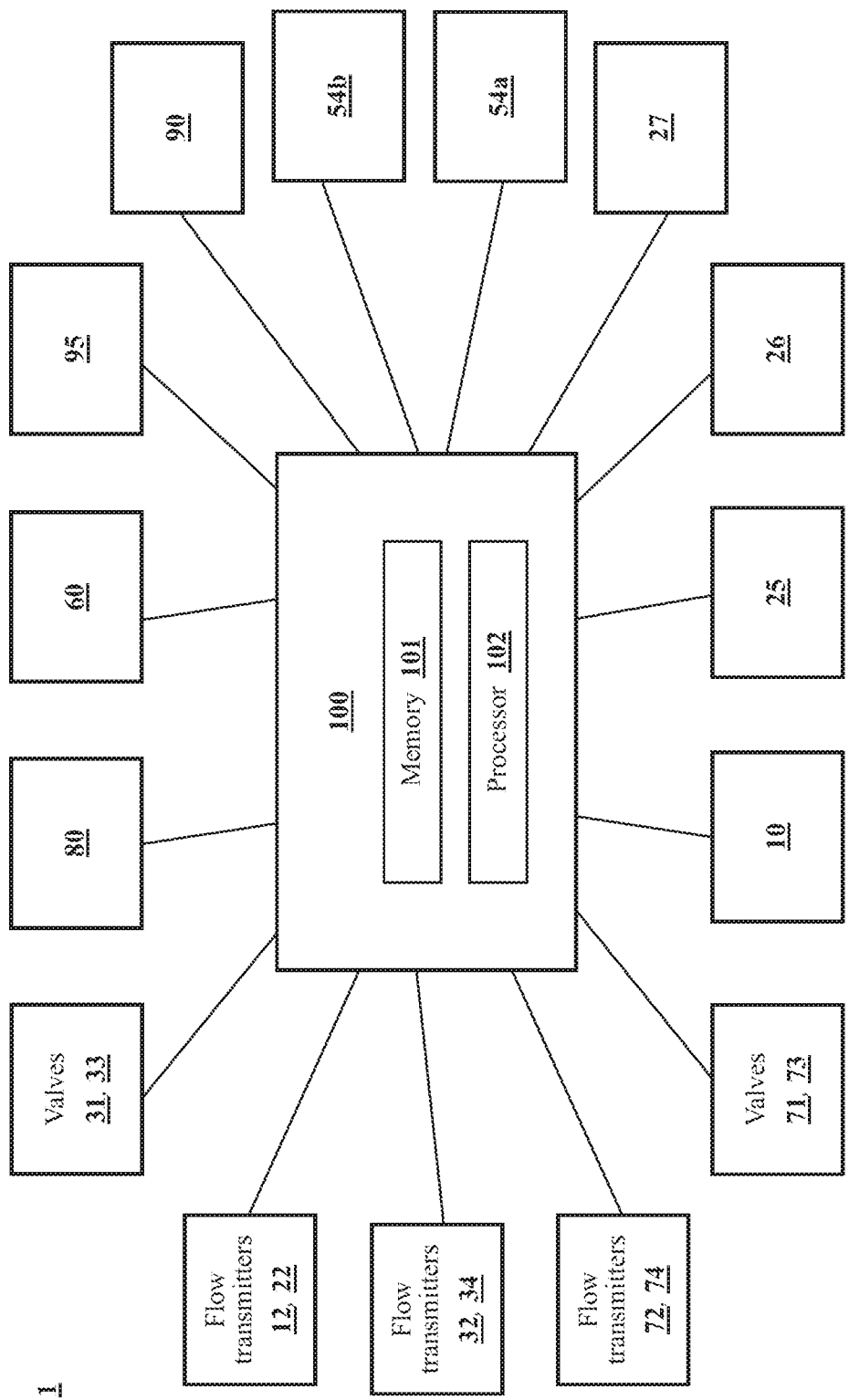
FIG. 2 is a schematic control diagram of the fuel cell system adapted for capturing carbon dioxide in flue gas shown in FIG. 1.

Referring to FIG. 2, the controller 100 includes a memory 101 for storing programmable logic and data and a processor 102 for executing the programmable logic stored in the memory 101. The controller is configured to receive a signal based on the measured voltage across the fuel cell assembly 50 from the fuel cell assembly voltage monitor 90. Based at least on the measured voltage across the fuel cell assembly 50, the controller 100 is also configured to determine an estimated carbon dioxide utilization of the fuel cell assembly 50 using the relationship between fuel cell voltage and carbon dioxide utilization described below.

Specifically, the controller 100 may be configured to determine the estimated carbon dioxide utilization by determining an expected voltage across the fuel cell assembly 50 based on the average temperature of the fuel cell assembly 50 (as measured by one or more temperature sensors 95, described below), a current density across the fuel cell assembly 50 (based on a measured fuel cell current as measured by a load controller 80, described below), a fuel utilization of the fuel cell assembly 50, and a cathode oxygen utilization of the fuel cell assembly 50. The controller 100 may be configured to determine the estimated carbon dioxide utilization by comparing the measured voltage across the fuel cell assembly 50, as measured by the fuel cell assembly voltage monitor 90, to the determined expected voltage across the fuel cell assembly 50. When the estimated carbon dioxide utilization is above a predetermined utilization threshold, the controller 100 is configured to reduce the carbon dioxide utilization of the fuel cell assembly 50 such that the carbon dioxide utilization of the fuel cell assembly 50 is at or below the predetermined high utilization threshold. Likewise, when the estimated carbon dioxide utilization is below a predetermined utilization threshold, the controller 100 is configured to increase the carbon dioxide utilization of the fuel cell assembly 50 such that the carbon dioxide utilization of the fuel cell assembly 50 is at or above the predetermined low utilization threshold.

Still referring to FIG. 2, the fuel cell system 1 also includes one or more temperature sensors 95 which are electronically coupled to the controller 100 and to the fuel cell assembly 50. The temperature sensors 95 are configured to measure temperatures within the fuel cell assembly 50 and provide a signal to the controller 100 based on the measured temperatures in the fuel cell assembly 50. The temperature sensors 95 may be located within the fuel cell assembly 50. The temperatures as measured by the temperature sensors 95 is useable by the controller 100 in determining the average temperature of the fuel cell assembly 50.

Referring to both FIGS. 1 and 2, the fuel cell system 1 also includes a load controller 80 configured to measure a current or load across the fuel cell assembly 50. The load controller 80 is also configured to send a signal to the controller 100 based on the measured current across the fuel cell assembly 50. Based on the measured current as measured by the load controller 80, the controller 100 is configured to determine the current density across the fuel cell assembly 50. The load controller 80 is also configured to be controllable by the controller 100. When the determined estimated carbon dioxide utilization is above a predetermined high threshold utilization, the controller 100 is configured to reduce the carbon dioxide utilization of the fuel cell assembly 50 by reducing the current across the fuel cell assembly 50. Likewise, when the determined estimated carbon dioxide utilization is below a predetermined low threshold utilization, the controller 100 is configured to increase the carbon dioxide utilization of the fuel cell assembly 50 by increasing the current across the fuel cell assembly 50.

Still referring to FIGS. 1 and 2, the flow transmitter 32 provides a measure of the flow rate of the fuel gas flow 30 to the controller 100. The anode inlet gas flow 35 may also include additional fuel from the anode exhaust gas recycle portion 66" as measured by the flow transmitter 74 and controlled by valve 73. The controller 100 is configured to determine a fuel utilization of the fuel cell assembly based on the measured flow rate of the fuel gas flow 30 and the anode exhaust gas recycle flow 66".

Still referring to FIGS. 1 and 2, the fuel cell system 1 also optionally includes a hydrogen gas analyzer 60 which is configured to measure a hydrogen content of the anode exhaust gas flow 55 output from the anode portion 52 of the fuel cell assembly 50. The hydrogen gas analyzer 60 is configured to provide a signal to the controller 100. The controller 100 is configured to determine a fuel utilization of the fuel cell assembly 50 based on the measured hydrogen concentration of the anode exhaust gas flow 55 and thereby more accurately determine the fuel utilization of the fuel cell assembly 50, as this relationship is more uncertain due to the addition of the anode exhaust gas recycle portion 66" as measured by flow transmitter 74. Using the hydrogen gas analyzer 60 allows for more optimal operation of the fuel cell assembly 50 by precision determination of fuel utilization allowing for fine adjustment of the fuel gas flow 30.

Still referring to FIGS. 1 and 2, the fuel cell system 1 also includes a cathode inlet gas flow transmitter 26 which is configured to measure a flow rate of the cathode inlet gas flow 53 and provide a signal to the controller 100 based on the measured flow rate of the cathode inlet gas flow 53. The fuel cell system 1 also includes a cathode inlet gas analyzer 27 which is coupled to the cathode portion 51 of the fuel cell assembly 50. The cathode inlet gas analyzer 27 is configured to measure a composition of the cathode inlet gas flow 53. Both the cathode inlet gas flow transmitter 26 and the cathode inlet gas analyzer 27 are configured to provide signals to the controller 100. The controller 100 is also configured to determine a cathode oxygen utilization and carbon dioxide utilization based on the measured flow rate of the cathode inlet gas flow 53 and the composition of the cathode inlet gas flow 53. The fuel cell system 1 also includes a cathode outlet gas flow transmitter 54a which is configured to measure a flow rate of the cathode exhaust gas flow 54 and provide a signal to the controller 100 based on the measured flow rate of the cathode exhaust gas flow 54. The fuel cell system 1 also includes a cathode outlet gas analyzer 54b which is fluidly coupled to the cathode portion 51 of the fuel cell assembly 50. The cathode outlet gas analyzer 54b is configured to measure a composition of the cathode exhaust gas flow 54 and provide a signal based on the composition of the cathode exhaust gas flow 54 to the controller 100. The controller 100 is configured to determine the cathode oxygen utilization and carbon dioxide utilization of the fuel cell assembly 50 based on the measured flow rate of the cathode exhaust gas flow 54 and the measured composition of the cathode exhaust gas flow 54.

Still referring to FIGS. 1 and 2, the fuel cell system also includes a flue gas blower 10 which is configured to receive a flue gas flow 6 from an external flue gas generating device 5 (such as a carbonaceous-fuel-fired power plant, gas or oil-fired boiler, heaters, furnaces, or other types or forms of flue gas generating devices). The flue gas flow 6 includes carbon dioxide of an unknown concentration. A flow rate of the derivative gas flow 15, which is derived from the flue gas flow 6, from the flue gas blower 10 to an anode gas oxidizer 25 is controlled via the speed controller 11. A flow transmitter 12 is configured to measure a flow rate of the flue gas flow 15 and to send a signal to the controller 100 based on the measured flow rate of the flue gas flow 15. When the determined estimated carbon dioxide utilization is above a predetermined threshold utilization, the controller 100 is configured to reduce the carbon dioxide utilization of the fuel cell assembly 50 by controlling the flue gas blower 10 to increase a flow rate of the flue gas flow 6 (or a derivative of the flue gas flow 6, such as flue gas flow 15) provided to the cathode portion 51 of the fuel cell assembly 50.

As shown in FIG. 1, the fuel cell system 1 also includes an anode exhaust processor 65 which is fluidly coupled to the anode portion 52 of the fuel cell assembly 50. The anode exhaust processor 65 is configured to receive the anode exhaust gas flow 55 from the anode portion 52 of the fuel cell assembly 50. The anode exhaust processor 65 is also configured to provide an anode return gas flow 66. The anode return gas flow 66 includes an anode exhaust gas return portion 66' which is provided by the anode exhaust processor 65 via an anode exhaust gas return line to the anode gas oxidizer 25 whose exhaust is supplied to cathode portion 51 of the fuel cell assembly 50. The flow of the anode exhaust gas return portion 66' is controllable by the controller 100, for example, using valve 71 based on a flow rate provided to the controller 100 by the flow transmitter 72.

The anode return gas flow 66 also includes an anode exhaust gas recycle portion 66" which is provided by the anode exhaust processor 65 to the anode portion 52 of the fuel cell assembly 50 via an anode exhaust gas recycle line. The flow of the anode exhaust gas recycle portion 66" is controllable by the controller 100, for example, using valve 73 based on a flow rate provided to the controller 100 by the flow transmitter 74. The anode exhaust processor 65 is also configured to provide a carbon dioxide product 67 using the carbon dioxide separated from the anode exhaust gas flow 55. The flow of the carbon dioxide product 67 is controllable by the controller 100 using any suitable means (not shown). The anode exhaust processor 65 is also configured to provide a water product 68 using the water separated from the anode exhaust gas flow 55. The flow of the water product 68 is controllable by the controller 100 using any suitable means (not shown). The anode exhaust processor 65 is also configured to provide a hydrogen product 69 using the hydrogen separated from the anode exhaust gas flow 55. The flow of the hydrogen product 69 is controllable by the controller 100 using any suitable means (not shown).

Using the valves 71, 73 or by controlling the anode exhaust processor 65, the controller 100 is configured to control the carbon dioxide utilization of the fuel cell assembly 50. For example, the controller 100 can increase or reduce an amount of carbon dioxide product 67 provided by the anode exhaust processor 65 and thereby reduce the carbon dioxide utilization of the fuel cell assembly 50. As another example, the controller 100 can reduce the amount of anode exhaust recycle portion 66" and increase an amount of the anode exhaust gas return portion 66' provided to the cathode portion 51 of the fuel cell assembly 50 and thereby reduce the carbon dioxide utilization of the fuel cell assembly 50.

As shown in FIG. 1, the fuel cell system 1 also includes the anode gas oxidizer 25 which is coupled to the cathode portion 51 of the fuel cell assembly 50. The anode gas oxidizer 25 is configured to receive a flow of flue gas 15 from the flue gas blower 10, receive the anode exhaust gas return portion 66' and receive an ambient air flow 23 from a fresh air blower 20 which receives an ambient air flow 7. A speed controller 21 of the fresh air blower 20 controls a flow rate of the ambient air flow 7 into the anode gas oxidizer. A flow transmitter 22 measures the flow rate of the ambient air flow 23 and is configured to provide a signal to the controller 100 based on the measured flow rate of the ambient air flow 7. By modulating the flow rate of the ambient air 23, the amount of oxygen delivered to the fuel cell assembly 50 is controlled by the controller 100 to maintain a desired oxidization utilization.

The anode gas oxidizer 25 is also configured to receive an oxidant gas, such as the ambient air flow 7 or flow 23. The anode gas oxidizer 25 is also configured to provide the oxidized flue gas to the cathode portion 51 of the fuel cell assembly 50 as the cathode inlet gas flow 53. The anode gas oxidizer 25 is also configured to receive at least a portion of the anode exhaust gas return portion 66' (described in more detail below). When the carbon capture process as described below is not implemented, all carbon dioxide present in the anode exhaust gas flow returns to the anode gas oxidizer 25 where it is subsequently provided to the cathode portion 51 of the fuel cell assembly 50.

To implement the carbon capture process, carbon dioxide from the flue gas flow 6 and/or derivative gas flow 15 is provided to the cathode portion 51 of the fuel cell assembly 50 by the anode gas oxidizer 25 via the cathode inlet gas flow 53. Because the carbon dioxide content of the flue gas flow 15 is unknown, the carbon dioxide content of the cathode inlet gas flow 53 is also unknown. Once the carbon dioxide enters the cathode portion 51 of the fuel cell assembly 50, the carbon dioxide is transferred to the anode portion 52 as carbonate ions by an electrochemical pumping (not shown). The carbon dioxide flux during this carbon dioxide transfer is determined by the load controller 80. The transferred carbon dioxide available in the anode portion 52 is higher in concentration and easier to separate from the water and hydrogen in the Anode Exhaust Processor 65. In the anode exhaust processor, carbon dioxide, water, and if necessary hydrogen are separated into different streams. If there is an insufficient concentration of carbon dioxide in the flue gas flow 6 or derivative gas flow 15, then to avoid over-utilization of carbon dioxide by the fuel cell assembly 50, at least one operating parameter of the fuel cell must be modulated. For example, the flue cell current (e.g., load) can be reduced, thereby reducing carbon dioxide flux. As another example, the amount of carbon dioxide product 67 can be reduced, thereby allowing more carbon dioxide exiting the anode portion 52 of the fuel cell assembly 50 to return to the cathode portion 51 via the anode gas oxidizer 25. As another example, the amount of anode exhaust recycle portion 66" can be reduce and the anode exhaust gas return portion 66' can be increased to provide more carbon dioxide in the cathode inlet gas flow 53 that is supplied to the Fuel Cell Assembly 50.

Figure 4:
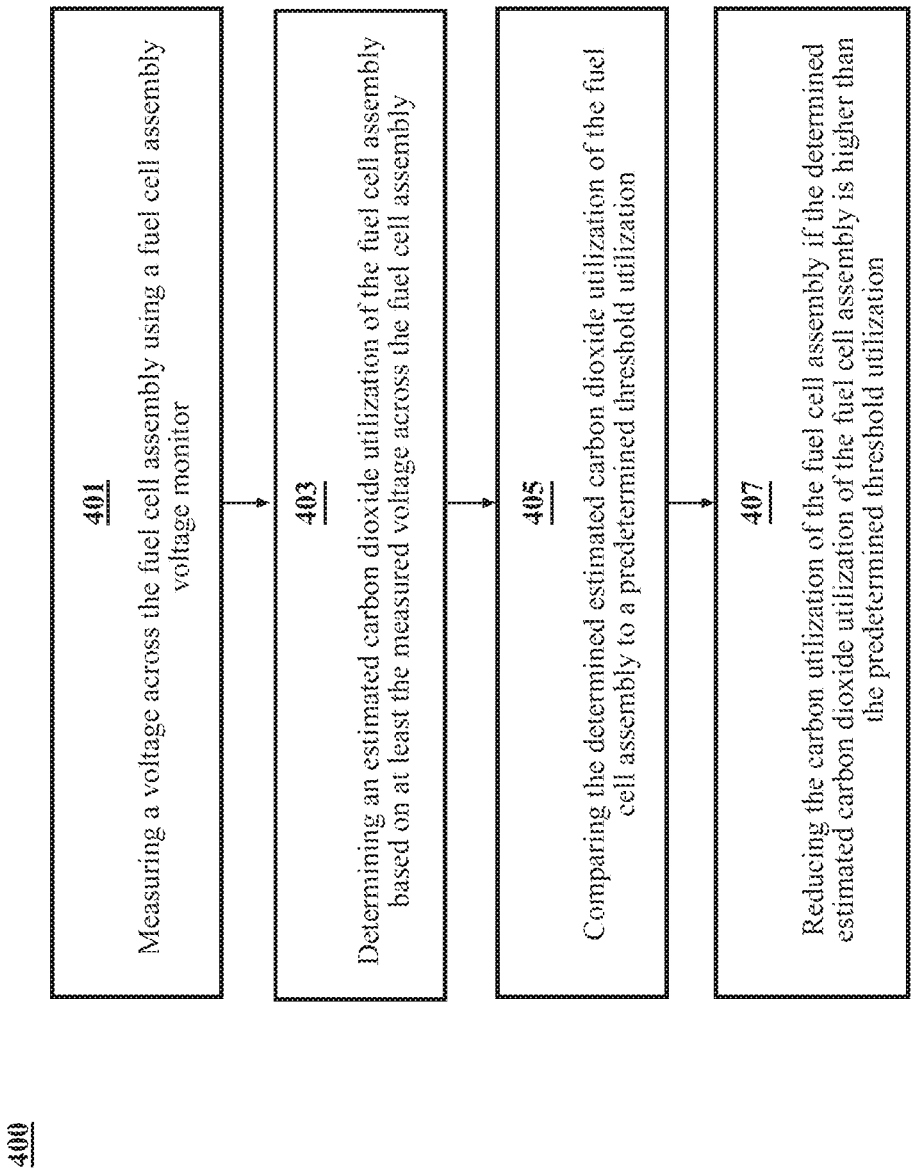
FIG. 4 is a flow chart illustrating a method of controlling a carbon dioxide capture rate from a fuel cell, according to an exemplary embodiment.

According to another exemplary embodiment of the present disclosure, shown in FIG. 4, a method 400 method for controlling a carbon dioxide utilization in a fuel cell assembly is shown. The method 400 includes the step 401 of measuring a voltage across the fuel cell assembly using a fuel cell assembly voltage monitor. The method 400 also includes the step 403 of determining an estimated carbon dioxide utilization of the fuel cell assembly based on at least the measured voltage across the fuel cell assembly by determining an expected voltage of the fuel cell assembly based on at least a temperature of the fuel cell assembly, a current density across the fuel cell assembly, and a fuel utilization of the fuel cell assembly, and determining the estimated carbon dioxide utilization based on a comparison between the measured voltage across the fuel cell assembly and the determined expected voltage across the fuel cell assembly. The method 400 also includes the step 405 of comparing the determined estimated carbon dioxide utilization of the fuel cell assembly to a predetermined threshold utilization. The method 400 also includes the step 407 of reducing the carbon dioxide utilization of the fuel cell assembly if the determined estimated carbon dioxide utilization of the fuel cell assembly is higher than the predetermined threshold utilization.

Although the examples above refer to a single controller 100, the aspects of the invention are not limited in this regard. In other examples, the system may include a plurality of controllers. For example, in some aspects, the system may include an anode inlet gas flow controller, a cathode inlet gas flow controller, an anode outlet gas flow controller, a cathode outlet gas flow controller, or a combination thereof.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present disclosure. For example, any element (e.g., the anode exhaust hydrogen sensor, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A method for controlling a carbon dioxide utilization in a fuel cell assembly, the method comprising:
    measuring a voltage across the fuel cell assembly using a fuel cell assembly voltage monitor;
    determining an estimated carbon dioxide utilization of the fuel cell assembly based on at least the measured voltage across the fuel cell assembly by determining an expected voltage of the fuel cell assembly based on at least a temperature of the fuel cell assembly, a current density across the fuel cell assembly, a fuel utilization of the fuel cell assembly, and a cathode oxygen utilization of the fuel cell assembly, wherein the estimated carbon dioxide utilization based on a comparison between the measured voltage across the fuel cell assembly and the determined expected voltage across the fuel cell assembly;
    comparing the determined estimated carbon dioxide utilization of the fuel cell assembly to a predetermined threshold utilization; and
    upon determining that the determined estimated carbon dioxide utilization of the fuel cell assembly is higher than the predetermined threshold utilization, reducing the carbon utilization of the fuel cell assembly.

2. The method of claim 1, wherein:
    an anode inlet gas of an anode portion of the fuel cell assembly comprises a fuel gas flow; and
    the method further comprises:
    measuring a flow rate of the fuel gas flow; and
    determining the fuel utilization of the fuel cell assembly based on at least the measured flow rate of the fuel gas flow.

3. The method of claim 1, further comprising:
    measuring a hydrogen content of an anode exhaust gas of an anode portion of the fuel cell assembly; and
    determining the fuel utilization of the fuel cell assembly based on at least the measured hydrogen content of the anode exhaust gas.

4. The method of claim 1, further comprising:
    measuring a flow rate of a cathode inlet gas of a cathode portion of the fuel cell assembly;
    measuring a composition of the cathode inlet gas; and
    determining the cathode oxygen utilization of the fuel cell assembly based on at least the measured flow rate of the cathode inlet gas and the composition of the cathode inlet gas.

5. The method of claim 1, further comprising:
measuring a flow rate of a cathode outlet gas of a cathode portion of the fuel cell assembly;
measuring a composition of the cathode outlet gas; and
determining the cathode oxygen utilization of the fuel cell assembly based on at least the measured flow rate of the cathode outlet gas and the composition of the cathode outlet gas.

6. The method of claim 1, comprising:
determining, by a controller, an average temperature of the fuel cell assembly based temperatures measured using a temperature sensor;
wherein the temperature of the fuel cell assembly used to determine the expected voltage of the fuel cell assembly is the average temperature of the fuel cell assembly.

7. The method of claim 1, comprising:
determining the current density across the fuel cell assembly based on a current across the fuel cell assembly as measured by a load controller.

8. The method of claim 1, further comprising:
measuring a flow rate of a cathode inlet gas;
measuring a composition of the cathode inlet gas;
measuring a flow rate of a cathode outlet gas;
measuring a composition of the cathode outlet gas; and
determining the cathode oxygen utilization of the fuel cell assembly based on at least the flow rate of the cathode inlet gas, the composition of the cathode inlet gas, the flow rate of the cathode outlet gas, and the composition of the cathode outlet gas.

9. The method of claim 1, wherein:
the carbon dioxide utilization of the fuel cell assembly is reduced at least by reducing the current density across the fuel cell assembly.

10. The method of claim 1, further comprising:
upon determining that the determined estimated carbon dioxide utilization of the fuel cell assembly is below the predetermined threshold utilization, increasing the carbon utilization of the fuel cell assembly at least by increasing the current density across the fuel cell assembly.

11. The method of claim 1, further comprising:
upon determining that the determined estimated carbon dioxide of the fuel cell assembly is lower than the predetermined threshold utilization, increasing the carbon dioxide utilization of the fuel cell assembly.

\* \* \* \* \*